US009721168B2

(12) United States Patent
Saptharishi et al.

(10) Patent No.: US 9,721,168 B2
(45) Date of Patent: *Aug. 1, 2017

(54) DIRECTIONAL OBJECT DETECTION

(71) Applicant: AVIGILON ANALYTICS CORPORATION, Vancouver (CA)

(72) Inventors: Mahesh Saptharishi, Arlington, MA (US); Douglas H. Marman, Ridgefield, WA (US)

(73) Assignee: AVIGILON ANALYTICS CORPORATION, Vancouver (CA)

( * ) Notice: Subject to any disclaimer, the term of this patent is extended or adjusted under 35 U.S.C. 154(b) by 1 day.

This patent is subject to a terminal disclaimer.

(21) Appl. No.: 15/240,933

(22) Filed: Aug. 18, 2016

(65) Prior Publication Data
US 2017/0185847 A1 Jun. 29, 2017

Related U.S. Application Data

(63) Continuation of application No. 14/885,499, filed on Oct. 16, 2015, now Pat. No. 9,449,398, which is a continuation of application No. 13/678,273, filed on Nov. 15, 2012, now Pat. No. 9,197,861.

(51) Int. Cl.
*H04N 7/18* (2006.01)
*G06K 9/00* (2006.01)

(52) U.S. Cl.
CPC ..... *G06K 9/00771* (2013.01); *G06K 9/00369* (2013.01); *G06K 9/00785* (2013.01); *H04N 7/183* (2013.01); *G06K 2009/00738* (2013.01); *G06T 2207/10016* (2013.01); *G06T 2207/30196* (2013.01); *G06T 2207/30232* (2013.01);

(Continued)

(58) Field of Classification Search
USPC ....... 348/135, 143, 142, 149, 153, 154, 156, 348/158, 169, 222.1, 565; 382/103, 107, 382/154, 166, 282; 715/700, 764; 345/419, 652
See application file for complete search history.

(56) References Cited

U.S. PATENT DOCUMENTS 5,334,974 A * 8/1994 Simms .................. B60R 25/102
340/426.18
6,249,740 B1 * 6/2001 Ito .......................... G01C 21/34
340/910
6,321,158 B1 11/2001 DeLorme et al.
(Continued)

*Primary Examiner* — Paulos M Natnael
*Assistant Examiner* — Mustafizur Rahman
(74) *Attorney, Agent, or Firm* — Baker Hostetler LLP

(57) ABSTRACT

Video analytics is used to track an object of interest represented in video data representing the field of view of a scene observed by a video camera. A multidimensional virtual beam is used to detect whether the tracked object of interest is continually present in a detection zone within the field view of the scene. An occurrence of an event is signaled when the tracked object of interest is continually present in the detection zone during a period beginning when the tracked object of interest enters the detection zone and ending when the tracked object of interest leaves the detection zone through the opposite side, after having completely crossed through the detection zone. Use of a virtual beam detection zone reduces false alarms as compared to the numbers of incidences of false alarms of traditional detection methods, while adding several features and benefits.

19 Claims, 8 Drawing Sheets

(52) U.S. Cl.
CPC ............... *G06T 2207/30241* (2013.01); *G06T 2207/30242* (2013.01); *G06T 2207/30252* (2013.01)

(56) References Cited

U.S. PATENT DOCUMENTS

| | | | |
|---|---|---|---|
| 6,658,136 B1 | 12/2003 | Brumitt | |
| 6,696,945 B1 | 2/2004 | Venetianer et al. | |
| 6,970,083 B2 | 11/2005 | Venetianer et al. | |
| 7,729,854 B2 | 6/2010 | Muramatsu | |
| 8,035,530 B2 | 10/2011 | Ramasubbu | |
| 8,165,348 B2 | 4/2012 | Hampapur et al. | |
| 8,165,805 B2 * | 4/2012 | Steins | G01C 21/36 345/184 |
| 8,359,160 B2 * | 1/2013 | Hess | G01C 21/3655 701/532 |
| 8,775,071 B2 * | 7/2014 | Achthoven | G01C 21/3638 701/426 |
| 8,787,725 B2 | 7/2014 | Lee | |
| 8,798,918 B2 | 8/2014 | Onishi et al. | |
| 8,953,044 B2 | 2/2015 | Wu et al. | |
| 8,977,498 B2 * | 3/2015 | Fino | 701/533 |
| 8,983,778 B2 * | 3/2015 | McCarthy | G06T 15/005 701/400 |
| 9,047,691 B2 | 6/2015 | Van Os et al. | |
| 9,076,212 B2 | 7/2015 | Ernst et al. | |
| 9,146,125 B2 | 9/2015 | Vulcano et al. | |
| 9,171,464 B2 | 10/2015 | Khetan et al. | |
| 2002/0044070 A1 * | 4/2002 | Duckeck | G08G 1/096811 340/988 |
| 2003/0028314 A1 * | 2/2003 | Nagamune | G01C 21/26 701/431 |
| 2004/0240542 A1 * | 12/2004 | Yeredor | G06K 9/00771 375/240.01 |
| 2005/0102183 A1 | 5/2005 | Kelliher et al. | |
| 2005/0137479 A1 | 6/2005 | Haider | |
| 2006/0170769 A1 | 8/2006 | Zhou | |
| 2006/0227862 A1 | 10/2006 | Campbell et al. | |
| 2006/0238347 A1 | 10/2006 | Parkinson et al. | |
| 2006/0243798 A1 | 11/2006 | Kundu et al. | |
| 2006/0269103 A1 * | 11/2006 | Brown | G06K 9/00778 382/103 |
| 2006/0291695 A1 | 12/2006 | Lipton et al. | |
| 2007/0008101 A1 | 1/2007 | Fallin et al. | |
| 2007/0058040 A1 | 3/2007 | Zhang | |
| 2007/0150179 A1 | 6/2007 | Pinkus et al. | |
| 2007/0219654 A1 | 9/2007 | Frink et al. | |
| 2007/0276597 A1 * | 11/2007 | Kato | G01C 21/3629 701/431 |
| 2008/0018738 A1 | 1/2008 | Lipton et al. | |
| 2008/0120392 A1 | 5/2008 | Dillon | |
| 2008/0303902 A1 | 12/2008 | Romer et al. | |
| 2009/0141939 A1 | 6/2009 | Chambers et al. | |
| 2009/0187322 A1 | 7/2009 | Yasui et al. | |
| 2009/0219387 A1 | 9/2009 | Marman et al. | |
| 2009/0237219 A1 | 9/2009 | Berlin et al. | |
| 2009/0245573 A1 | 10/2009 | Saptharishi et al. | |
| 2009/0273489 A1 | 11/2009 | Lu | |
| 2010/0013917 A1 | 1/2010 | Hanna et al. | |
| 2010/0046799 A1 | 2/2010 | Saptharishi et al. | |
| 2010/0057358 A1 * | 3/2010 | Winer | G01C 21/3407 701/414 |
| 2011/0043631 A1 | 2/2011 | Marman et al. | |
| 2011/0205359 A1 | 8/2011 | Lee et al. | |
| 2012/0062732 A1 | 3/2012 | Marman et al. | |
| 2012/0207346 A1 | 8/2012 | Kohli et al. | |
| 2012/0236024 A1 * | 9/2012 | Fujii | G06T 1/00 345/620 |
| 2012/0242809 A1 * | 9/2012 | White | G08G 1/0175 348/51 |
| 2012/0259539 A1 | 10/2012 | Sumizawa | |
| 2012/0259541 A1 | 10/2012 | Downey et al. | |
| 2012/0275521 A1 * | 11/2012 | Cui | H04N 5/23254 375/240.16 |
| 2013/0035853 A1 | 2/2013 | Stout et al. | |
| 2013/0191020 A1 | 7/2013 | Emani et al. | |
| 2013/0266190 A1 | 10/2013 | Wang et al. | |
| 2014/0132758 A1 * | 5/2014 | Saptharishi | H04N 7/18 348/135 |

* cited by examiner

DIRECTIONAL OBJECT DETECTION

CROSS REFERENCE TO RELATED APPLICATION

This application is a continuation of U.S. patent application Ser. No. 14/885,499, filed Oct. 16, 2015, which is a continuation of U.S. patent application Ser. No. 13/678,273 filed Nov. 15, 2012, now U.S. Pat. No. 9,197,861 issued Nov. 24, 2015, the contents of each of which are incorporated herein by reference in their entirety.

TECHNICAL FIELD

This disclosure relates generally to detection of objects using video analytics, and, in particular, to either two- or three-dimensional virtual beam detection for video analytics.

BACKGROUND

Physical security systems have long used beam detectors for the detection of people and vehicles. A typical beam detector includes a light source at one end and a light sensor at the opposite end. For example, the light source may include one or more infrared LEDs emitting a beam of light toward the light sensor, which is tuned to detect the wavelength of light emitted by the light source. If a person or vehicle breaks the beam of light propagating between the light source and the light sensor, the light sensor will detect a drop in the intensity of the light reaching the sensor and thereby trigger an alarm. Beam detectors are prone to false alarms, which can occur, for example, when an animal or leaf blowing in the wind crosses the beam. The detector can also be rendered useless, intentionally or by accident, if the light source or the light sensor becomes blocked, forcing an attendant to visit the site to correct the problem. For this reason, more robust systems use a series of light sources and sensors to create a series of beams that all must be tripped before alarm-producing detection occurs.

Video surveillance technology may also be used as part of a physical security system. For example, a video surveillance camera captures images of a scene. The images may be viewed by a human observer, or the images may be transmitted to a video analytics system for detecting and tracking objects as they move through the field of view of the video camera. The video analytics system may distinguish between objects of interest and objects not of interest. For example, a human being or a vehicle may be an object of interest, but an animal or a blowing leaf may be an object not of interest. Video-based surveillance can be at least partly automated when the video analytics system includes a virtual tripwire or a region of interest (ROI) for triggering an event.

A typical virtual tripwire is a line superimposed over an image captured by a surveillance camera. An event may be triggered when the video analytics system detects an object of interest crossing the virtual tripwire. For example, the surveillance camera is positioned to capture images of a street in front of a sidewalk. A virtual tripwire may be drawn across the sidewalk, and an event would be triggered when an object of interest, such as a person, walks along the sidewalk and crosses the tripwire.

A typical ROI is defined by an area superimposed over an image captured by a surveillance camera. An event may be triggered when the video analytics system detects an object of interest moving within the area. Alternatively, an event may be triggered when the video analytics system detects an object of interest entering or leaving the area.

However, virtual tripwires and ROIs are prone to false alarms. One instance of a false alarm would be, for example, the triggering of an event when even a small portion of an object of interest crosses a tripwire or enters an ROI. Because a typical tripwire does not have a three-dimensional shape, the exact location covered by the tripwire may not always be clear. For example, a tripwire drawn across a sidewalk may appear to be on the sidewalk, but depending on the viewpoint of the camera, a person walking near the sidewalk or across the street may trigger an event if the person's head, rather than the person's feet, crosses the tripwire.

ROIs may create false alarms when used to detect people entering or leaving a doorway, because anyone walking by the front of the doorway, without passing through the doorway, may trigger an event. As another example, an ROI sized to count cars on a highway may produce false alarms caused by tree branches, shadows, headlights, or animals moving into or within the ROI. Detecting objects moving in a specific direction may also be more difficult when using an ROI for triggering an event, especially if the object wanders around and does not follow a straight path.

Moreover, the detection zone of a virtual tripwire or an ROI is static. In other words, the virtual tripwire or the ROI does not move once a user of the video surveillance system defines the tripwire or the ROI.

SUMMARY

The disclosed preferred embodiments implement methods and systems for reducing false alarms when monitoring whether an object of interest is passing through a detection zone within a field of view of a scene observed by a video camera.

According to one embodiment, video data representing the field of view of the scene observed by the video camera are received. Video analytics is used to track the object of interest represented in the video data. A multi-dimensional virtual beam is used to detect whether the tracked object of interest is continually present in the detection zone. An occurrence of an event is signaled when the tracked object of interest is continually present in the detection zone during a period beginning when the tracked object of interest enters the detection zone and ending when the tracked object of interest leaves the detection zone through the opposite side, after having completely crossed through the detection zone.

The multi-dimensional virtual beam may represent a two-dimensional area or a three-dimensional volume. For example, a two-dimensional virtual beam may correspond to an area superimposed over an image represented by the video data. As another example, a three-dimensional virtual beam may correspond to a volume of space oriented in a three-dimensional representation of the scene observed by the video camera.

Additional aspects and advantages will be apparent from the following detailed description of preferred embodiments, which proceeds with reference to the accompanying drawings.

DETAILED DESCRIPTION OF ILLUSTRATIVE EMBODIMENTS

The disclosed preferred embodiments implement methods and systems for reducing false alarms when monitoring whether an object of interest is passing through a detection zone within a field of view of a scene observed by a video camera. The object of interest may be tracked to determine whether the tracked object of interest is continually present in the detection zone as the tracked object of interest crosses from one side of the detection zone to the other side of the detection zone. In one example, the detection zone may be observed by a video surveillance system including video analytics and a virtual beam. The virtual beam can be used to define opposite sides of the detection zone. For example, the virtual beam can be drawn on a computer screen over the visual image rendered from video data generated by a surveillance camera to define the area of detection, similar to the way an ROI is drawn. However, a virtual beam can be drawn as a two-dimensional or three dimensional space.

Figure 1:
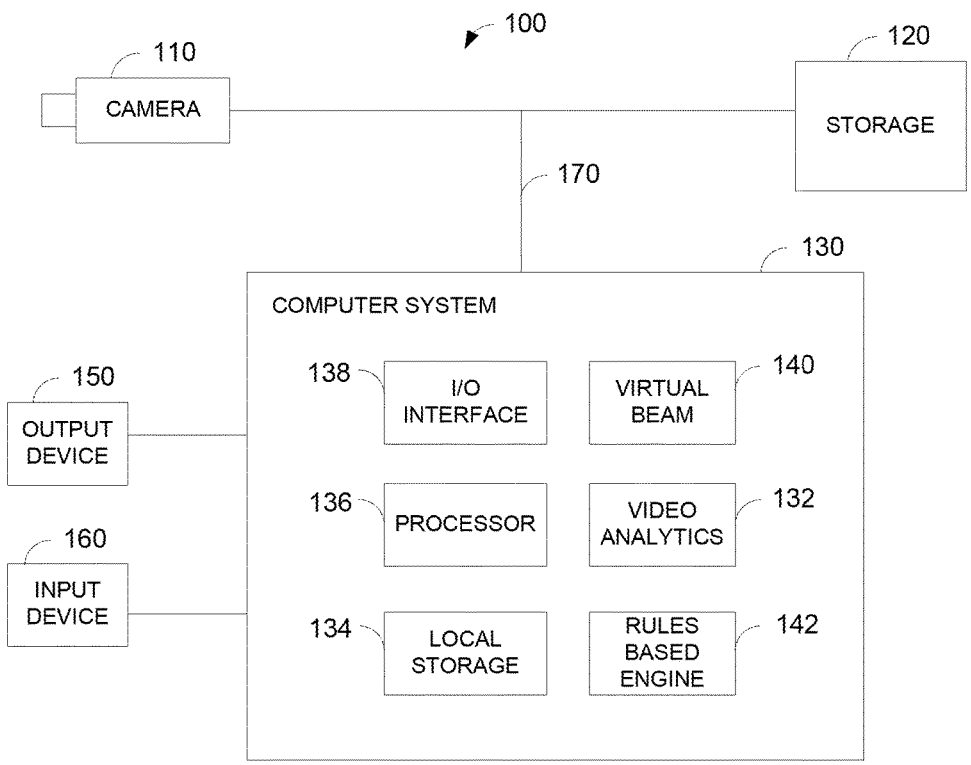
FIG. 1 is a block diagram of one embodiment of a video surveillance system.

FIG. 1 illustrates a block diagram of one embodiment of a video surveillance system 100, which includes a camera 110, mass storage 120, a computer system 130, an output device 150, and an input device 160. Video surveillance system 100 may include an interconnection network 170 for connecting camera 110, mass storage 120, and computer system 130 to one another. As used herein, the term "connected" means logically or physically connected directly or indirectly through one or more intermediaries. Interconnection network 170 facilitates wired or wireless communication among camera 110, mass storage 120, and computer system 130. For example, interconnection network 170 may include the Internet, Ethernet, Universal Serial Bus (USB), asynchronous transfer mode (ATM), Packet over SONET/SDH (POS), Peripheral Component Interconnect Express (PCI-Express), IEEE 802.11 (Wi-Fi), cellular telephone network, or other interconnect that is capable of providing a communication pathway among came a 110, mass storage 120, and computer system 130.

Camera 110 includes an imaging system for capturing images of a scene observed by camera 110. Camera 110 may be a video camera generating video data representing the field of view of the scene observed by the video camera. In one example, camera 110 may be a video camera as described in commonly owned U.S. Patent Application Pub. No. 2009/0219387, titled "Intelligent High Resolution Video System." Camera 110 may have a fixed field of view or a variable field of view. A camera with a variable field of view may be of a pan-tilt-zoom (PTZ) type having mechanically driven optics to zoom-in on objects, for example. The field of view of the camera includes a detection zone or an area to be monitored. For example, the detection zone may include a secured area where entry is restricted, or the detection zone may include an area leading to a cashier in a store where the length of a check-out line may be monitored.

Camera 110 may capture images in the visible light spectrum or in any other spectrum suitable for monitoring the detection zone. For example, images may be captured in color, black and white, or infrared. Further, metadata and data from multiple spectra may be embedded with the video data. For example, audible signals may be recorded and included with the video data. As another example, timestamp, position, type of object detected, or other metadata may be embedded with the video data. Camera 110 may capture a single view or multiple views of a scene, such as in stereo vision, for example.

The video data may be formatted as an analog or digital signal, and the video data may be encrypted or compressed. For example, the video data may be encoded in the NTSC/PAL, MPEG-4 SVC, H.264, or any other format suitable for recording time sequenced images. Camera 110 may be programmable and capable of producing multiple quality levels of video data, including higher quality (HiQ) video data and lower quality (LowQ) video data. A quality level refers to multiple video parameters including resolution, frame rate, bit rate, and compression quality. For example, HiQ video data may represent high definition 1080p resolution video recorded at 30 frames-per-second (fps), and LowQ video data may represent D1 resolution video recorded at 5 fps. HiQ and LowQ video data are not limited to the parameters above. HiQ video data may represent high definition 1080p resolution video recorded at a lower frame rate-for example, 15 fps. In general, HiQ video data are video data that represent higher quality video than that of LowQ video data. Camera 110 may produce more than two quality levels of video data. Camera 110 may be capable of producing different quality levels for different portions of a field of view within a video frame. For example, camera 110 may generate HiQ quality video data representing an object of interest, e.g. a person, in the field of view while simultaneously generating LowQ video data representing background scene images of the field of view. As described further herein, video analytics 132 is used to differentiate between objects of interest and background images of the field of view.

Mass storage 120 is used for recording video data from camera 110. Mass storage 120 may also be used for storing metadata associated with the video data, rules used by video surveillance system 100, and intermediate data, such as during compression and decompression of the video data. Mass storage 120 may be hierarchical. For example, mass storage 120 may include a hard disk drive housed with camera 110 and a video server connected by means of a local area network (LAN) or a wide area network (WAN). Mass storage 120 may include semiconductor memory, an optical storage device, a magnetic storage device, such as a hard disk drive, or any combination of them. The amount of storage capacity may be determined based on at least the desired time to retain video data, the resolution of the video data, the compression of the video data, and the number of cameras writing to mass storage 120. For example, a typical camera can generate approximately 0.4 GB of video data each day when images are captured with CIF resolution at 5 fps and are compressed with H.264 compression. As another example, a typical camera can generate approximately 5.4 GB of video data each day when images are captured with 01 resolution at 15 fps and are compressed with MPEG-4 compression.

Computer system 130 receives video data and includes video analytics 132 and virtual beam 140 modules. Computer system 130 may be integrated in the same housing as camera 110, remote from camera 110, or distributed across network 170. Video data may be received by an input/output (I/O) interface 138, for example. Video analytics 132 and virtual beam 140 modules may be implemented in hardware, software, or combinations of them. For example, computer-executable instructions for implementing virtual beam 140 may be stored in local storage 134 and executed by processor 136. Processor 136 may include a Freescale Semiconductor® i.MX27 multimedia applications processor or a Texas Instruments DaVinci™ DM6437 processor, for example. As another example, virtual beam 140 may be implemented in a field programmable gate array (FPGA) or application specific integrated circuit (ASIC). Local storage 134 may include a semiconductor memory, a magnetic storage device, an optical storage device, or any combination of them. Semiconductor memory may include read only memory (ROM) programmable ROM, random access memory (RAM), or flash memory. A magnetic storage device may include a floppy disk drive, a hard disk drive, a magnetic drum, a magnetic tape, or a magneto-optical disk. An optical storage device may include compact disc or holographic memory.

Computer system 130 communicates with output device 150. Output device 150 may include a display, an audible or visual alarm, a pager, a cellular telephone, a land line telephone, or other device capable of displaying video data or alerting an attendant when an object of interest is passing through the detection zone. For example, video data from camera 110 may be streamed by I/O interface 138 to output device 150, such as a video display. As another example, a text message may be sent to output device 150, such as a cellular telephone, when video analytics module 132 detects a tracked object of interest that is continually present in the detection zone as the tracked object of interest crosses through the detection zone in a predefined direction.

Computer system 130 communicates with an input device 160. Input device 160 may include a keyboard, a pointing device, such as a mouse or a touch screen, a microphone, a cellular telephone, a land line telephone, or other device capable of allowing a user to provide input to computer system 130. For example, input device 160 may be a keyboard, and a user may send a command or setup information to computer system 130 by typing on the keyboard. As a second example, input device 160 may be a mouse, and a user may indicate a boundary of the detection zone by using the mouse to drag a cursor along the boundary over an image of the scene observed by camera 110. As a third example, input device 160 may be a sensor or an external arming signal that could be used by rules to determine an event of interest. One implementation would be use of an alarm system signal for the purpose of indicating the system is armed also for the purpose of arming the virtual beam detection rule.

Computer system 130 includes video analytics 132. Video analytics 132 analyzes the video data generated by camera 110 to detect whether a predefined event or object of interest is being captured by camera 110. A preferred embodiment of video analytics 132 is described in commonly owned U.S. Patent Application Pub. No. 2009/0245573, titled "Object Matching for Tracking, Indexing, and Search." The video data analyzed by video analytics 132 is preferably HiQ video data. Video analytics 132 generates metadata that describe the content of video data. The metadata produced by video analytics 132 may be a textual and semantic description of the content of the video.

Events and objects of interest may be programmed by a user and specified in an XML definitions file. The definitions file and video analytics 132 may be updated periodically. Video analytics 132 may include multiple analytic capabilities. Multiple events of interest may be defined, and more than one event of interest may occur at a particular time. Also, the nonoccurrence of one event leaves open the possibility of an occurrence of a second event. The metadata may be supplied for storage in local storage 134 and mass storage 120. The metadata representing an arbitrary frame n can be associated with video data representing frame n. Thus, the metadata may be searchable to allow a user to efficiently search and semantically browse large video archives, whether stored locally or remotely.

An event of interest that video analytics 132 detects may be as simple as motion in the field of view. Video analytics 132 may also implement blob detection (e.g., detecting a group of moving pixels as a potential moving object, without identifying what type of object it is), lighting change adjustment, and geometric calibration based on object size in the field of view to distinguish objects based on types. For example, video analytics 132 may be able to classify an object as a human being, a vehicle, or another type of object and be able to recognize an object when it appears in any portion within the field of view of camera 110. Furthermore, video analytics 132 may be able to recognize certain identifiable features of an object such as, for example, human faces and vehicle license plates. Video analytics 132 may be able to recognize when camera 110 is capturing a new object and assign a unique object ID to the new object. Video analytics 132 may be able to recognize the speed and trajectory at which an object moves. Video analytics 132 may be able to recognize events such as perimeter intrusion, object movement in a particular direction, objects approaching one another, a number of objects located in a specified area, objects left behind, and object removal. Video analytics 132 can also recognize specific locations, or coordinates, within the field of view where an event or object of interest is being captured, or a combination of objects and events, as defined by a rule.

When video analytics 132 detects an event or object of interest within the video data, video analytics 132 generates metadata that correspond to the event or object of interest and supplies the metadata to rules based engine 142. Rules based engine 142 includes rules that associate events or objects of interest, specified in the metadata, to specific actions to be taken. The actions associated with the rules may be to perform, for example, one or more of the following: signaling an event when a tracked object of interest is continually present in the detection zone during a period beginning when the tracked object of interest enters a detection zone and ending when the tracked object of interest leaves the detection zone through the opposite side, after having completely crossed through the detection zone; signaling an event when a number of objects of interest crossing the detection zone and continually present in the detection zone exceeds a threshold number; signaling an event when a first object of interest is continually present in a detection zone, the detection zone associated with a second object of interest, as the first object of interest crosses the detection zone; store HiQ or LowQ video data in local storage 134; store HiQ or LowQ video data in remote mass storage 120; stream HiQ or LowQ video data from output device 150 to a user; generate and send from output device 150 to a user a short video clip file of the event of interest; send an alert (e.g., instructions to generate one or both of a visual display and an audible sound) from output device 150 to a user; store video data in mass storage 120 for X period of time. For example, a user may define the following rule: when a human being crosses a detection zone from one side to the other side, store in local storage 134 HiQ video data representing the intrusion, provide to a user by an output device 150 such as a pager an alert of the intrusion, generate a short video clip of the intrusion and send the video clip to output device 150 such as a display, and store in remote mass storage 120 HiQ video data representing the intrusion. Or, a user may define the following rule: when no event or object of interest is being captured, store in local storage 134 LowQ video data and send no video data to output device 150. Because video analytics 132 can detect various objects and events, a wide variety of rules may be defined by a user. Also, because multiple events of interest may occur simultaneously, a rule may correspond to a combination of events.

An application of counting objects crossing the detection zone and generating reports from object count data can provide traffic flow pattern information. For example, placement of virtual beams at critical locations in a retail store enables determination of customer traffic flow throughout the store. A report can be generated to show customer traffic patterns based on time of day, seasons of year, or comparison of traffic flow among multiple store locations.

A rule may use a multi-dimensional virtual beam 140 for reducing false alarms when monitoring whether an object of interest is passing through the detection zone. Virtual beam 140 is used to define boundaries of the detection zone within the field of view of the scene observed by camera 110. Virtual beam 140 includes an entrance side and an exit side on opposite boundaries of the detection zone. Virtual beam 140 detects whether an object of interest is continually present in the detection zone as the object enters the entrance side of, crosses completely through, and leaves through the exit side of the detection zone. Objects entering the detection zone from any side other than the entrance side will be ignored. Objects that appear or disappear within the detection zone, or move only within the detection zone, will also be ignored.

Virtual beam 140 may be associated with one or more objects. As one example, a type of object to be detected may be configured during detection rules setup, such as by choosing from a drop-down computer menu. Virtual beam 140 may be set to detect general types of objects, such as people, vehicles, or boats. Virtual beam 140 may be set to detect more specific types of objects, such as school buses, fire trucks, red sedans, people riding bicycles, adults, or non-guards. As another example, and as further elaborated in FIGS. 7 and 8, virtual beam 140 may be associated with an object of interest.

Figure 2:
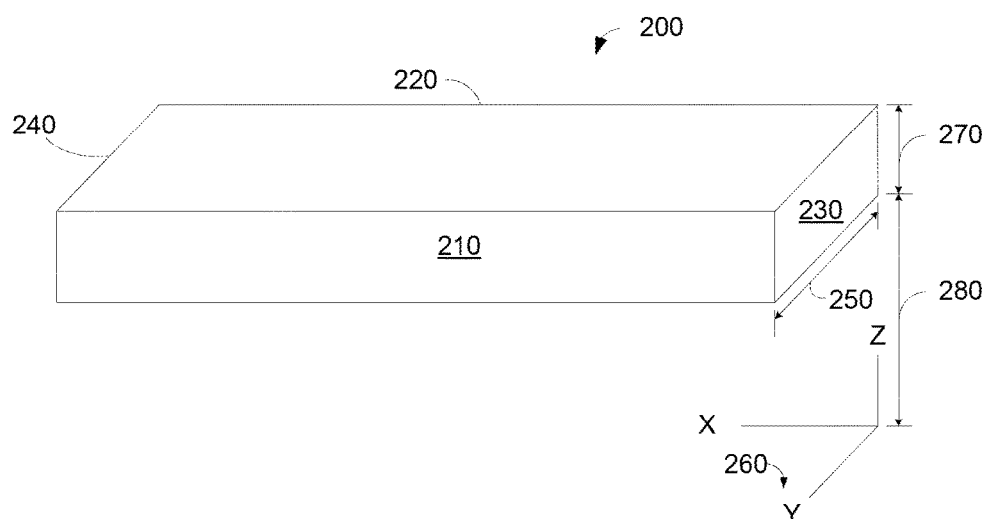
FIG. 2 is a schematic diagram of one embodiment of a three-dimensional virtual beam.
Figure 3:
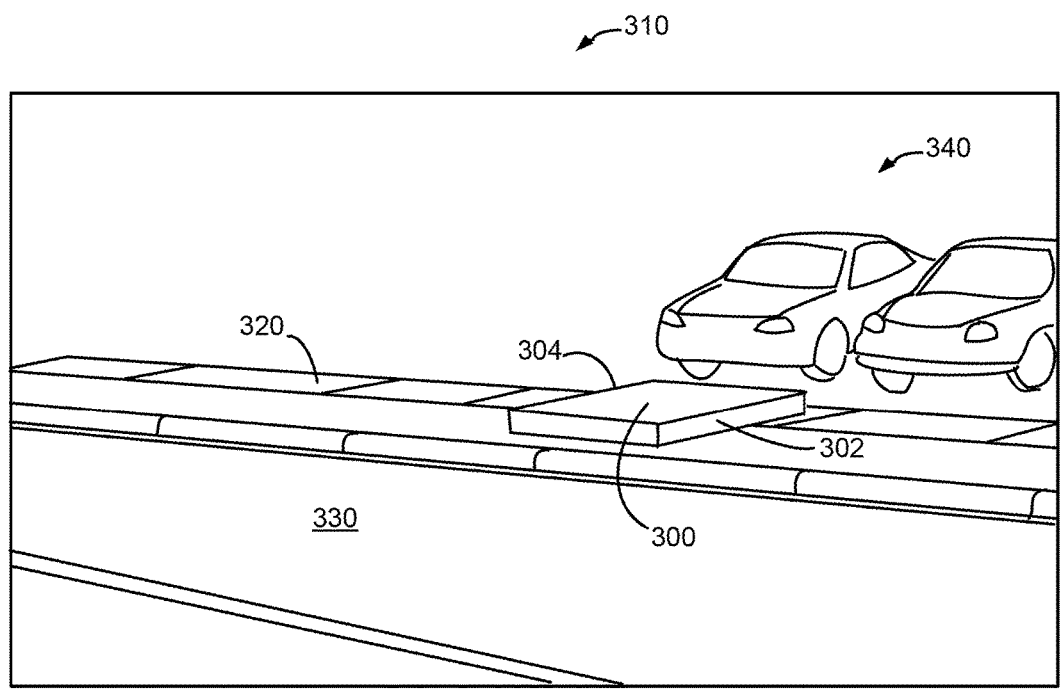
FIG. 3 is a pictorial diagram illustrating one embodiment of a three-dimensional virtual beam in a scene within a field of view of a video camera.
Figure 4:
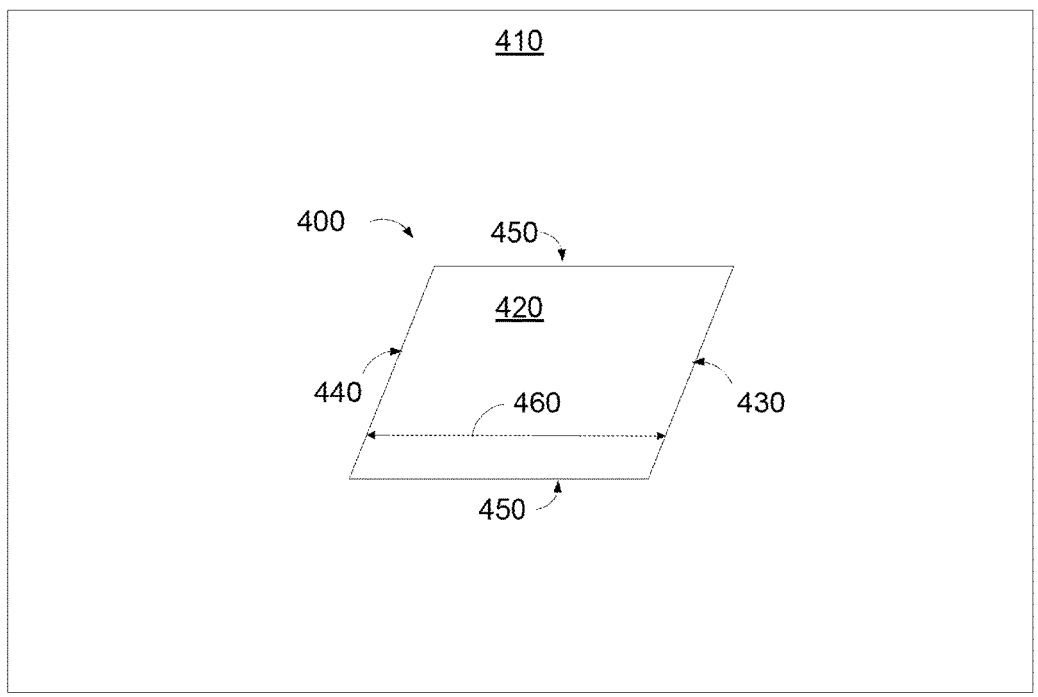
FIG. 4 is a schematic diagram of one embodiment of a two-dimensional virtual beam.

Virtual beam 140 is multi-dimensional and can be defined as a two-dimensional or three dimensional space. FIG. 2 is a schematic diagram of one embodiment of a three-dimensional virtual beam, and FIG. 3 is a pictorial diagram illustrating how a three-dimensional virtual beam may be overlaid with a three-dimensional representation of a scene within a field of view of a video camera. FIG. 4 is a schematic diagram of one embodiment of a two-dimensional virtual beam.

A virtual beam can act as a four-dimensional beam by inclusion of a measure of time elapsed in crossing the virtual beam. An example is setting as a detection rule a speed limit of travel of an object through the virtual beam. This can be accomplished by establishing a time allowed for an object to pass through the virtual beam of known distance between its entrance and exit sides. An object taking too much or too little time to cross the virtual beam could trigger an event of interest.

FIG. 2 illustrates one embodiment of a three-dimensional virtual beam 200 that defines a detection zone that includes an entrance side 210 and an exit side 220 located on the opposite side of the detection zone. As illustrated in FIG. 2, entrance side 210 and exit side 220 are the borders of the detection zone, which has a rectangular shape and is arranged in parallel planes, but other shapes and arrangements are possible. For example, a virtual beam zone of detection may be defined as an annulus, i.e., a ring with thickness. Generally, the detection area of a three-dimensional virtual beam may be planar, curved, or include one or more linear borders.

Virtual beam 200 exhibits an inherent direction of motion because events are detected when a tracked object of interest is continually present in the detection zone, after the tracked object of interest enters entrance side 210 of the detection zone, thereafter crosses through the detection zone, and leaves completely the detection zone from exit side 220, thereby triggering detection. In other words, a direction of virtual beam 200 may be defined by an object entering through entrance side 210 and triggering detection when the object crosses through the detection zone and leaves completely through exit side 220. Virtual beam 200 may also ignore objects entering or leaving through other sides of the detection zone, such as sides 230 and 240. Objects entering or leaving the detection zone through sides 230 and 240 will be ignored. One virtual beam is used to detect an object crossing a detection zone in a single direction. Multiple virtual beams may be used to detect an object crossing a detection one in multiple directions. For example, two virtual beams defining the same detection zone, but swapping the entrance and exit sides, may be set up to detect traffic going in two directions.

A distance 250 between entrance side 210 and exit side 220 may be varied to customize a false alarm immunity versus a sensitivity of detection. Distance 250 may be lengthened to widen virtual beam 200 and to reduce false alarms. In other words, distance 250 may be lengthened to increase false alarm immunity. Distance 250 may be shortened to narrow virtual beam 200 and increase sensitivity of detection.

Virtual beam 200 may be aligned with a spatial location within a three-dimensional representation of the scene observed by camera 110. The three-dimensional representation may be created manually, such as by a user or an installer providing a physical mapping of the background scene to rules based engine 142. For example, a ground plane 260 of the visual scene may be manually entered by use of input device 160. In an alternative embodiment, video analytics 132 can automatically observe and analyze traffic, such as people and vehicles in various areas of the scene, to generate a ground plane model, including the angle of the ground plane. The three-dimensional representation of the scene may include a horizon, where ground plane 260 appears to intersect the sky from the field of view of camera 110. Similar to the ground plane, the horizon may be manually entered or automatically detected by operation of video analytics 132.

Distance 250 may be shortened or lengthened, depending on how far the detection zone is from camera 110 or how close the detection zone is to camera 110. For example, an area closer to the horizon in the video scene is typically farther away than areas farther from and below the horizon. Thus, it may be desirable to have a wider virtual beam for areas closer to camera 110 compared to areas farther from camera 110, since each pixel located near the horizon may represent more distance traveled than each pixel located farther from and below the horizon would represent. Similarly, a height 270 of the detection zone may be increased or reduced depending on how far away from or close to the detection zone is from camera 110. For example, it may be desirable to increase height 270 as the detection zone is positioned closer to camera 110 to provide similar false alarm immunity as that provided by a detection zone positioned farther from camera 110.

Virtual beam 200 may include a detection zone having a border coincident with ground-plane 260 or above ground-plane 260, such as at height 280. FIG. 3 illustrates how a three-dimensional virtual beam 300 may be overlaid on a three-dimensional representation of a scene 310 within a field of view of a video camera. FIG. 3 shows a suburban car lot with a sidewalk 320 proximal to one side of which several cars 340 are parked side by side and proximal to the other side of which a street 300 runs parallel. Virtual beam 300 includes a detection zone with a boundary coincident with a ground plane located on the surface of sidewalk 320. Virtual beam 300 includes detection sides 302 and 304 and is preferably configured to detect only the feet and lower portions of the legs of a human being as an object of interest. If detection side 302 is the entrance side and detection side 304 is the exit side, virtual beam 300 can detect people walking along sidewalk 320 from right to left. If detection side 304 is the entrance side and detection side 302 is the exit side, virtual beam 300 can detect people walking along sidewalk 320 from left to right. In this manner, the movement of people along the sidewalk can be monitored with high false alarm immunity. For example, people walking on the street, in front of sidewalk 320, will be ignored when their heads rather than their feet pass through virtual beam 300. As used with reference to FIG. 3, "in front of" means closer to camera 110.

As an alternative to mapping a three-dimensional representation of the scene, a two-dimensional virtual beam may be used as an overlay on an image represented by video data. For example, a three-dimensional representation of a scene may not be available because a user has not manually entered a physical mapping of the background scene or video analytics 132 has not completed calibrating the scene. As another example, a two-dimensional virtual beam may be implemented with fewer computational resources than those used in implementing a three-dimensional virtual beam. Skilled persons will appreciate that the dimensions of a scene and the dimensions of a virtual beam are separate and distinct. A three-dimensional virtual beam need not be used with a three-dimensional representation of a scene. A two-dimensional beam can, therefore, be located in a three-dimensional representation of a scene. Moreover, a three-dimensional virtual beam can be implemented by a two-dimensional beam and a rule specifying the height of an object.

FIG. 4 illustrates one embodiment of a two-dimensional virtual beam 400 overlaid on an image 410 represented by video data from camera 110. Virtual beam 400 can be used to define the entrance and exit sides of a detection zone 420. For example, virtual beam 400 may include an entrance side 430 bounding detection zone 420 on one side and an exit side 440 bounding detection zone 420 on the opposite side. Virtual beam 400 may include one or more sides 450 where the entrance or exit of objects is ignored. Virtual beam 400 includes a distance 460 between entrance side 430 and exit side 440. Increasing distance 460 may reduce false alarms, and decreasing distance 460 may increase sensitivity of detection. Although the two-dimensional virtual beam 400 illustrated in FIG. 4 is a parallelogram and entrance side 430 and exit side 440 are parallel to each other, other shapes and arrangements are possible. For example, an entrance side may be defined as the outer border of a ring with thickness, and an exit side may be defined as an inner border of the ring contained within the perimeter of the outer border. Generally, the entrance and exit sides of a two-dimensional virtual beam may be linear, curved, or include one or more linear border segments.

Figure 5:
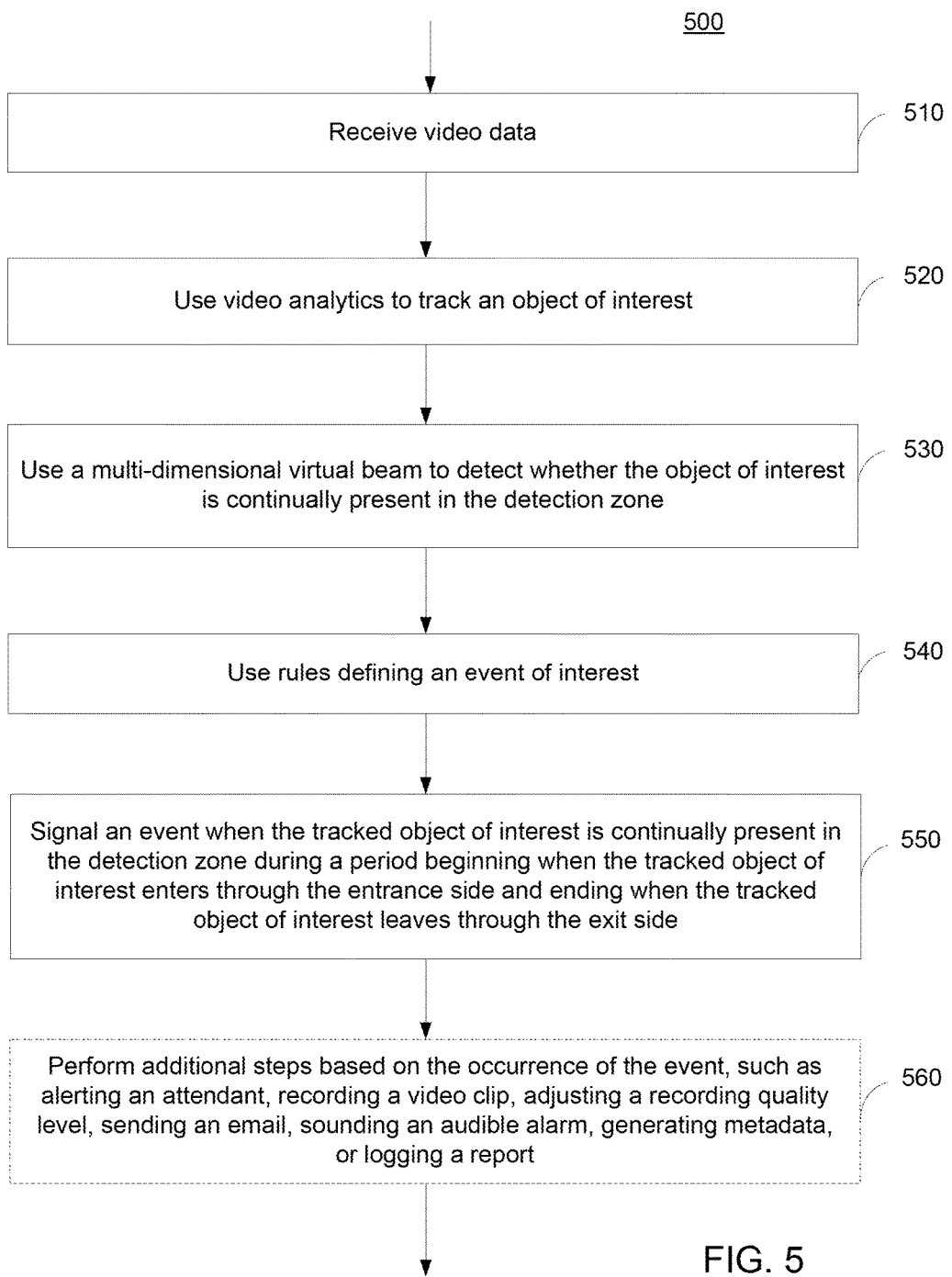
FIG. 5 is a flowchart of a method of monitoring whether an object of interest is passing through a detection zone within a field of view of a video camera, according to one embodiment.
Figure 6:
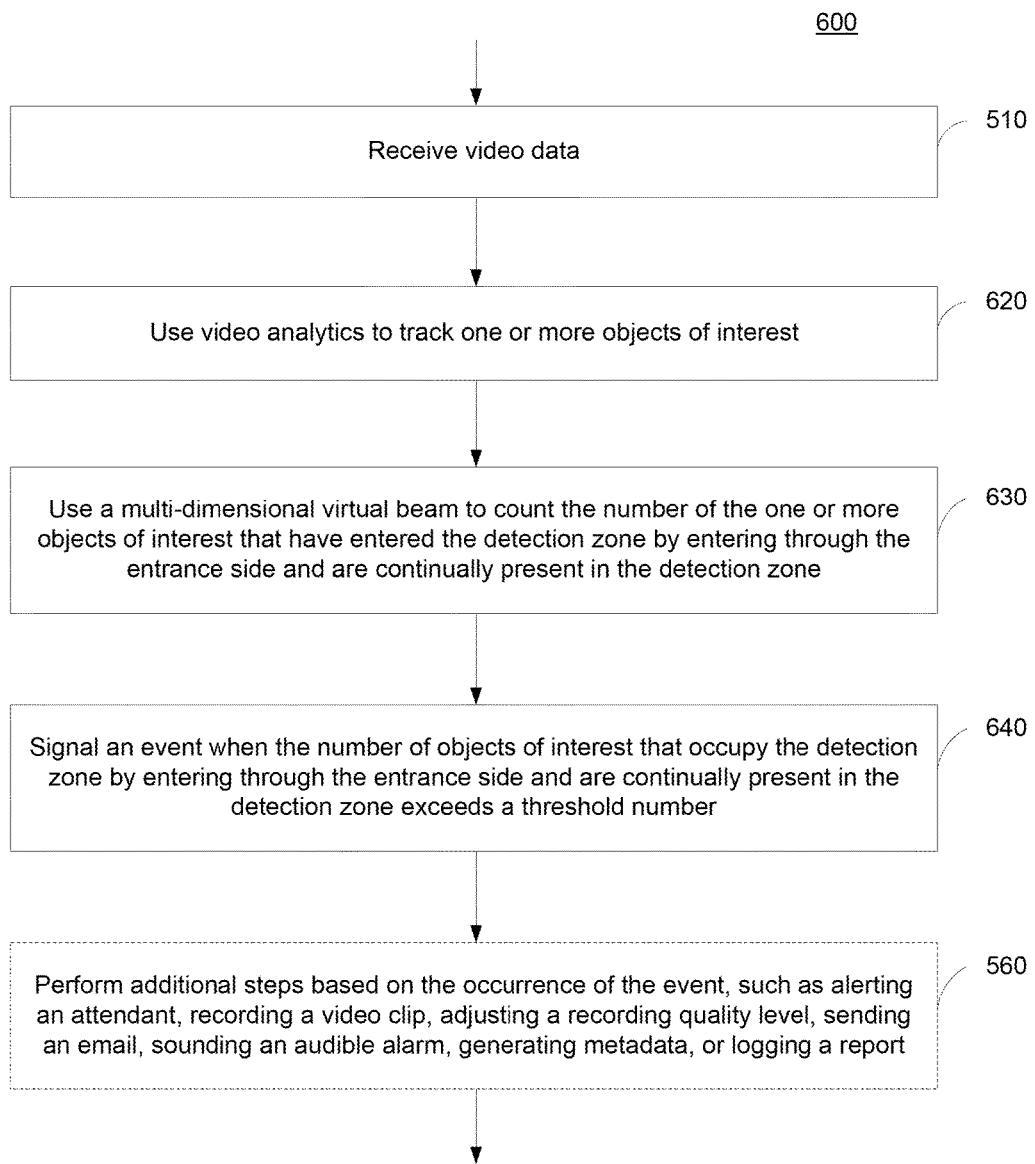
FIG. 6 is a flowchart of a method of monitoring whether one or more objects of interest are located in a detection zone within a field of view of a video camera, according to one embodiment.
Figure 7:
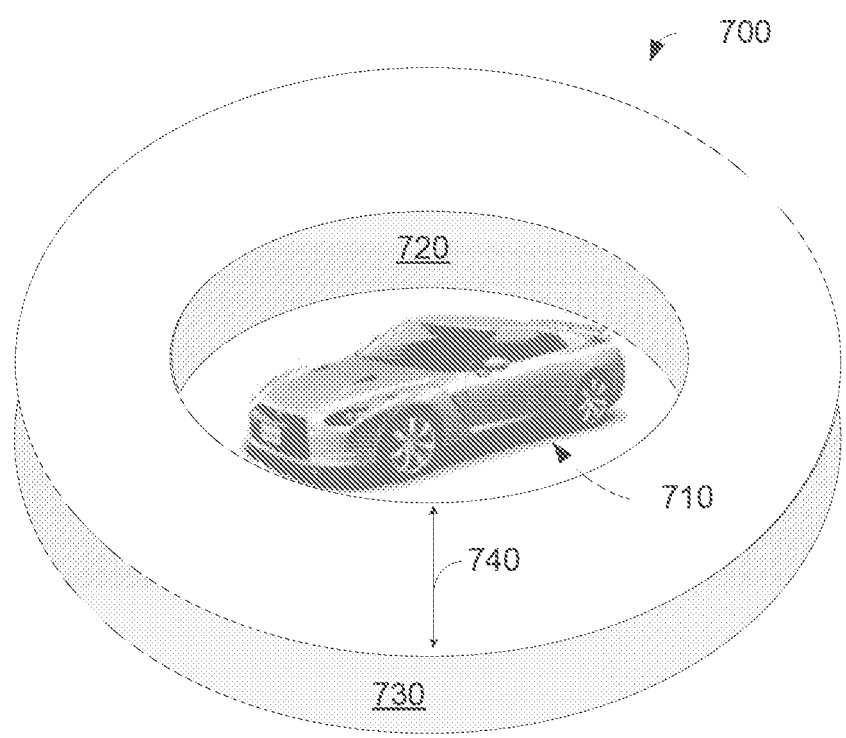
FIG. 7 is a pictorial diagrammatic view of one embodiment of a virtual beam associated with an object of interest.
Figure 8:
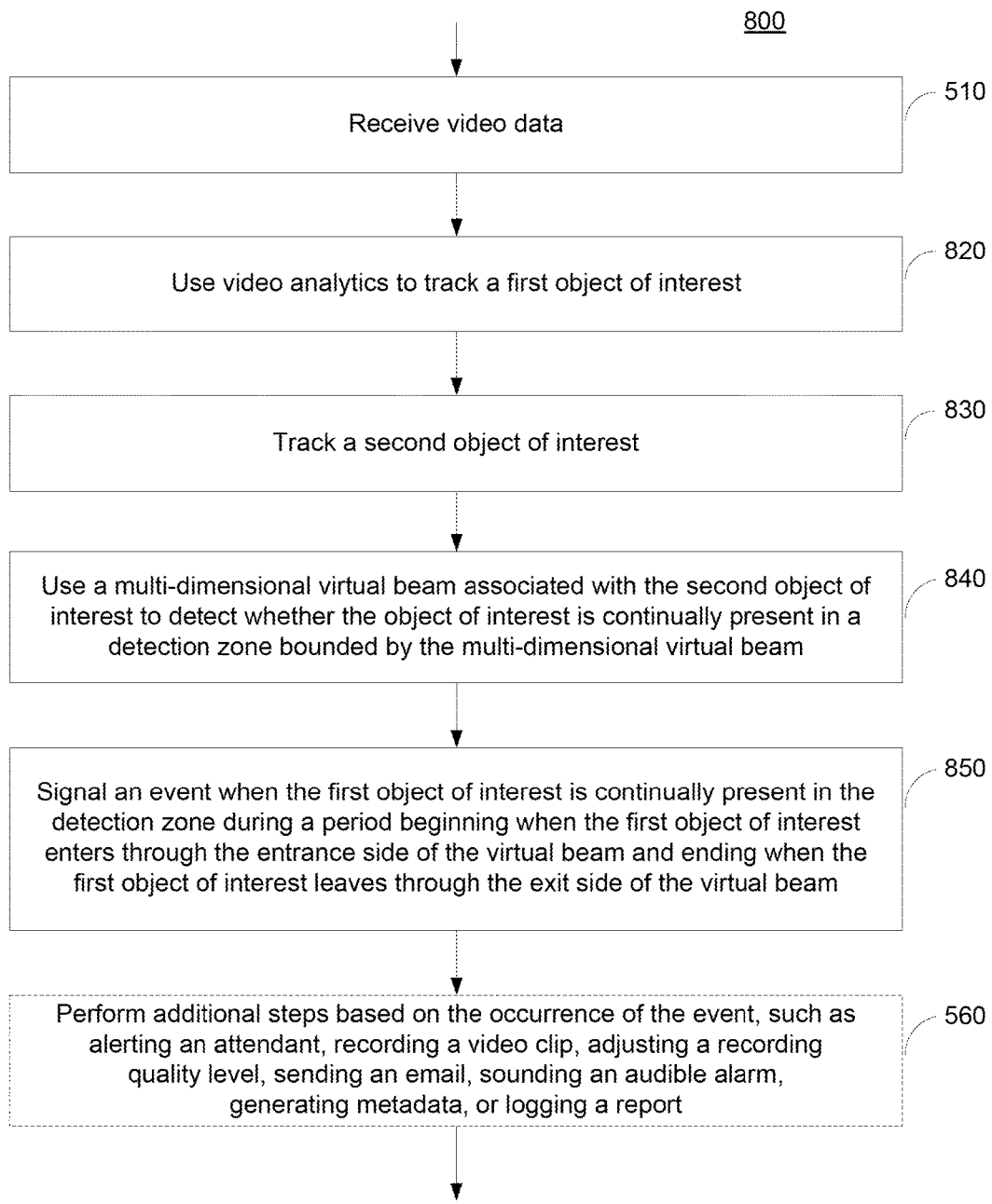
FIG. 8 is a flowchart of a method of monitoring whether a first object of interest is passing through a detection zone that is within a field of view of a video camera and is associated with a second object of interest, according to one embodiment.
Figure 9:
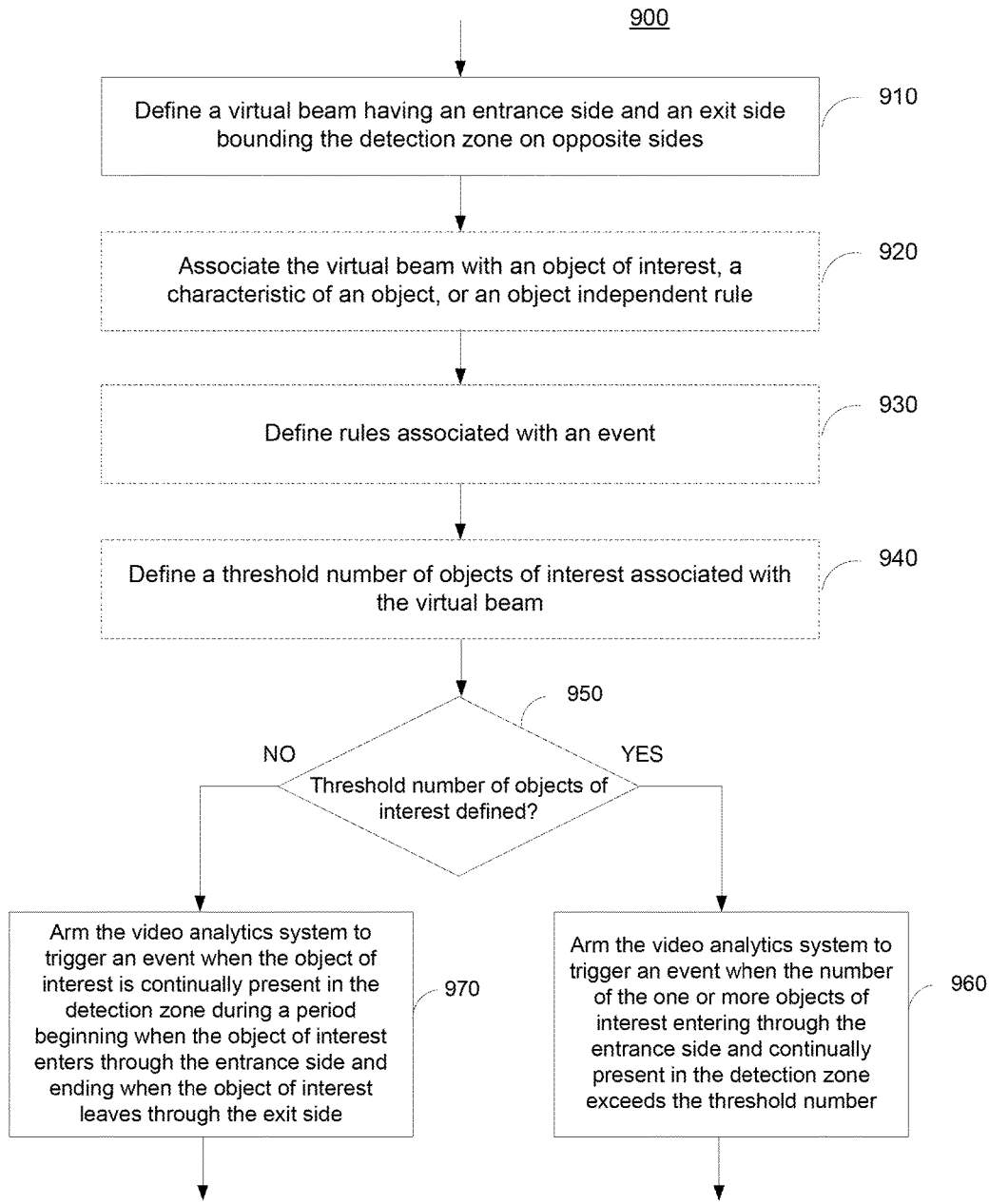
FIG. 9 is a flowchart of a method of configuring a virtual beam, according to one embodiment.

A multi-dimensional virtual beam can be used to implement methods to monitor an object of interest in a detection zone within a field of view of a video camera. FIG. 5 illustrates an embodiment of a method of monitoring whether the object of interest is passing through the detection zone. FIG. 6 illustrates an embodiment of a method of monitoring whether more than a threshold number of objects of interest are located in the detection zone. FIG. 8 illustrates an embodiment of a method of monitoring whether a first object of interest is passing through the detection zone when the detection zone is associated with a second object of interest, such as illustrated in FIG. 7, for example. Common to all of the methods are: receiving video data (510); using video analytics to track one or more objects (such as 520, 620, and 820); using a virtual beam to detect whether an object is continually present in the detection zone (such as 530, 630, and 840); signaling an event based on whether one or more objects are continually present in the detection zone combined with one or more other conditions (such as 540, 640, and 850); and optionally performing additional steps based on the occurrence of the event (550). Finally, FIG. 9 illustrates a method of configuring a virtual beam that may be used in the methods illustrated in FIGS. 5, 6, and 8.

FIG. 5 is a flowchart of a method 500 of monitoring whether an object of interest is passing through a detection zone within a field of view of a video camera, according to one embodiment. Method 500 may be implemented, for example, by video surveillance system 100. Method 500 begins at 510 by receiving video data. The video data may be received in real-time, such as from camera 110, or delayed from when the video data were recorded. Real-time data may be delayed by computations or buffering within video surveillance system 100. For example, real-time data may be delayed by encoding, decoding, compressing, decompressing, packetizing, or other system delays. As another example, video data from camera 110 may be recorded at mass storage 120 or local storage 134, stored for a time, and then retrieved at a later time for post-processing by method 500.

At 520, video analytics 132 are used to track the object of interest represented in the video data. An object of interest may be tracked based on one or more criteria, including criteria corresponding to characteristics of the object and criteria that may be unrelated to the object. For example, the object of interest may be tracked based on one or more combinations of the type, color, shape, size, or speed of motion of the object. In a preferred embodiment, video analytics 132 can recognize or identify an object, such as with blob detection technology or advanced video motion detection, so that the object may be more accurately tracked.

Video analytics 132 may assign an object type to an identified object, and rules can be set up to determine whether the identified object is of a type that will be tracked. For example, object types may include human beings, vehicles, animals, or of suspicious or unknown type. In an alternative embodiment, an object of interest may be tracked based on pixel mot on, such as by recognizing pixel changes moving across a scene, without identifying the object.

The speed of motion of an object may be used to determine whether the object is to be detected as an even of interest. For example, video analytics 132 may detect a speed associated with a moving object, and rules can be set up to determine a range of speeds for objects that will trigger an alarm. For example, a speeding car may be considered to be an event of interest, or a slow-moving car, such as a car caught in a traffic jam, may be an event of interest, but cars moving at normal speeds may be ignored. As another example, a person walking slowly through a parking lot or a person running through a hallway may be an event of interest, but people walking at normal speeds may not be events of interest. The motion or trajectory of an object may be used to determine whether it is an event of interest. For example, an object may be considered to be of interest based on whether the object has a smooth or a chaotic trajectory, whether the object is stationary or moving, or whether the object exhibits abnormal activity.

The color of an object may be used to determine whether the object is considered to be of interest. For example, a red sedan could be considered to be of interest and cars of different colors could be ignored. Tracking objects of a given color may be used to aid police officers when they are looking for a car with a known color, such as during an Amber alert or when a car has been reported stolen. Similarly, the shape of car, which may correspond to a make and model of the car, may be used to determine whether the car is considered to be of interest. As another example, employees or guards may have uniforms of one color and people wearing a different color may be considered to be of interest for certain types of activities, such as entering into employee-only areas.

Colors corresponding to temperatures may be used to determine whether an object is considered to be of interest. In one embodiment, a thermal camera may generate different colors corresponding to different temperatures. In an alternative embodiment, a thermal camera may generate black and white images, with the intensity of the white corresponding to different temperatures. A threshold color or intensity may be set, and when the color or intensity of the object exceeds the threshold, the object can be identified as an object of interest. One application in which tracking objects based on color from a thermal camera may be desirable is the monitoring of electrical substations. For example, the spread of unwanted heat in substation equipment may be tracked to provide an early warning of occurrences and potentially reduce the expense of system failures.

A tracked object of interest may be part of another object of interest. Examples of objects that may be part of another object include a license plate of a vehicle or a face, arm, or head of a person. Tracking a license plate can be useful when combined with a license plate recognition system. Similarly, tracking a face can be useful when combined with a facial recognition system. Tracking a part of an object may improve the accuracy of tracking. For example, tracking heads may be more accurate than tracking full bodies, especially when a full view of the bodies may be obscured by obstacles or heavy traffic, such as in an airport or a train terminal.

Furthermore, rules not associated with an object may be set up to determine whether an object should be considered to be an object of interest. Examples of rules not associated with an object include ambient light level, time of day, occurrences of earlier events, or combinations of them. For example, a rule can be set up so that vehicles are considered to be of interest in a parking lot only if the parking lot lights are turned off. As another example, a rule can be set up so that people are considered to be of interest only between the hours of 10:00 p.m. and 6:00 a.m.

Video analytics 132 may associate metadata with a tracked object of interest. Examples of metadata include object type, color, speed, trajectory, an identifier label, bounding box coordinates, event data, and any other information that may describe an aspect of the object. The identifier label may be created by video analytics 132 when the object of interest is first identified. The identifier label may persist between video frames until the object of interest moves out of the field of view of camera 110. Bounding box coordinates may identify a boundary around the object of interest in a video frame or in a three-dimensional representation of the scene observed by video camera 110. For example, bounding box coordinates may be a set of (X, Y) pixel coordinates corresponding to the edges of the object of interest in a video frame. Bounding box coordinates will move with an object of interest, and the bounding box coordinates may be filtered through a smoothing function between frames to reduce jerkiness. As another example, bounding box coordinates may be a set of (X, Y, Z) coordinates corresponding to the boundary of the object of interest in the three-dimensional representation of the scene observed by video camera 110. Event data may include whether an event occurred or a time-stamp of when an event occurred.

At 530, a multi-dimensional virtual beam is used to detect whether the tracked object of interest is continually present in the detection zone. The multi-dimensional virtual beam may be a two-dimensional virtual beam, such as virtual beam 400; or the virtual beam may be a three-dimensional virtual beam, such as virtual beam 200. In one embodiment, an object is "continually" present in the detection zone when the object is present in the detection zone in every video frame during the period of interest. In an alternative embodiment, a filter may be applied such that the object is "continually" present in the detection zone even if the object is absent from the detection zone for a small number of video frames, such as one or two video frames. By using a filter, anomalies resulting from video decompression or jerky updates of a bounding box may be reduced.

The presence of an object in the detection zone may be determined in different ways. In one embodiment, the object is "present" in the detection zone when a bounding box associated with the object intersects or is contained within the detection zone. In an alternative embodiment, the object is "present" in the detection zone when a center of the bounding box associated with the object intersects or is contained within the detection zone. In yet another embodiment, the object is "present" in the detection zone when any pixel of the object intersects or is contained within the detection zone.

When an object is first present in the detection zone, metadata, such as an entry time-stamp, may be created and associated with the object. Similarly, an exit time-stamp may be created and associated with the object when the object exits the detection zone. In one embodiment, the entry and exit time-stamps of the object may be compared to time-stamps marking the time during which the object is present in the detection zone to determine whether the object is continually present in the detection zone.

At 540, rules-based criteria are used to define an event of interest. Criteria may include, for example, time of day or week, speed of object, color of object, type of object, and multiple objects simultaneously crossing the virtual beam. Another criterion may be establishing as the virtual beam an annulus surrounding an object of interest.

At 550, an event is signaled when the tracked object of interest is continually present in the detection zone during a period beginning when the tracked object of interest enters through the entrance side of the virtual beam and ending when the tracked object of interest crosses through the detection zone and leaves through the exit side of the virtual beam. Examples of rules for determining when the object enters through an entrance side include: (1) when a bounding box associated with the object first enters the detection zone through the entrance side, (2) when a center of the bounding box associated with the object enters the detection zone through the entrance side, (3) when any pixel of the object enters the detection zone through the entrance side, and (4) when a bounding box associated with the object enters the detection zone through the complete height of the detection zone (for three-dimensional virtual beams). The rules for determining when the object enters or leaves the detection zone may be different. The rules for determining when the object enters or leaves the detection zone may vary the sensitivity and false alarm immunity for the detection zone crossing. For example, rule (1) would likely be more sensitive than would rule (2) for detecting an object entering a detection zone, e.g., rule (1) would detect entry of an object into a detection zone sooner than would rule (2), but rule (1) might result in more false alarms than would rule (2).

At 560, additional steps may be optionally performed based on the occurrence of an event, such as the event signaled at 550. Examples of the additional steps include alerting an attendant, recording a video clip, adjusting a recording quality level, sending an email, sounding an audible alarm, generating metadata, or logging a report. An attendant may be alerted by operation of output device 150, such as by sounding an audible alarm, sending a text or recorded voice message to the attendant's phone, or highlighting a video clip on the attendant's display. A video clip may be recorded at local storage 134 or mass storage 120, for example.

Method 500 may be used in a variety of applications. For example, the steps of method 500 may be performed with virtual beam 300 to detect people walking along sidewalk 320 as described with reference to FIG. 3. Similarly, use of a virtual beam in the performance of method 500 may detect a person entering a property area with no physical barriers, such as a schoolyard that adjoins a wooded area.

Method 500 may be used for fence beam applications, such as detecting a person climbing a fence or a cellular telephone tower by having an entrance side of a virtual beam set near the bottom of the structure and an exit side set at a higher point of the structure. The distance between the entrance side and the exit side can be used to determine how far the person must climb before an alarm is triggered. The height of the exit side over the entrance side can be used to determine how tall the person needs to be to create a detection. The distance between entrance and exit sides may reduce false alarms caused by tree branches blowing in the wind, birds landing on the fence, or even small animals, such as squirrels crawling up the fence. In this fence beam application, false alarms caused by passers-by may also be reduced, since people crossing only from the entrance side to the exit side will generate an alarm.

Method 500 may be used for a virtual corridor application, such as for a one-way exit at an airport or a museum. The distance between entrance and exit sides or depth of the virtual beam can be used to establish how far people must travel in one direction before being detected. Increasing the depth may reduce false alarms caused by people stopping to momentarily turn around before exiting. For example, movements opposite to the direction of the exit might be caused by a person turning around to wave goodbye to someone, stepping backwards for a moment, or deciding not to leave. The height of the virtual beam can also be set to just detect the heads of people and thereby may be helpful in crowded areas where it may be difficult for the camera to see full body views.

Method 500 may be used for a virtual doorway application, in which the height of the virtual beam determines how tall a person needs to be for detection. For example, the virtual beam can be set across the entrance to a shopping mall. By selecting the height of the virtual beam, the system can count only adults, not children. Alternatively, the height of the virtual beam can be set to detect children, so that video analytics 132 can determine which adults are near the children when they enter. The system can later create an alert, if one of those children leaves unaccompanied by one of the adults with whom the child entered. Thus, method 500 may provide a method of providing early warning of potential child abduction.

FIG. 6 is a flowchart of a method 600 of monitoring whether one or more objects of interest are located in a detection zone within a field of view of a video camera, according to one embodiment. Method 600 may be implemented, for example, by video surveillance system 100. Method 600 begins at 510 by receiving video data.

At 620, video analytics 132 are used to track the one or more objects of interest represented by the video data. Video analytics 132 distinguishes one or more objects of interest so that the number of objects of interest can be counted at 630. In one embodiment, video analytics 132 assigns a unique identifier label to each object. An object of interest may be tracked based on one or more criteria, including criteria corresponding to characteristics of the object and criteria unrelated to the object. Video analytics 132 may associate metadata, such as the identifier label and bounding box coordinates, with each tracked object of interest.

At 630, a multi-dimensional virtual beam is used to count the number of objects of interest that have entered the detection zone by crossing the entrance side and are continually present in the detection zone at about the same time. The multi-dimensional virtual beam may be a two-dimensional virtual beam, such as virtual beam 400, or a three-dimensional virtual beam, such as virtual beam 200. Whether an object enters the detection zone by entering through the entrance side may be determined according to the rules described at 550. The continual presence of one or more objects of interest in the detection zone may be determined in a manner as described at 530. In one embodiment, the number of objects of interest that are continually present in the detection zone may be counted by counting the number of objects having unique identifier labels continually present in the detection zone.

At 640, an event is signaled when the number of objects of interest entering through the entrance side and continually present in the detection zone at about the same time, and crossing through the detection zone and leaving through the exit side, exceeds a threshold number. The threshold number may be preconfigured by a user, such as with method 900 (FIG. 9), for example. Furthermore, video analytics 132 may adjust the threshold number based on one or more conditions detected by video analytics 132. Finally, at 560, additional steps may be optionally performed based on the occurrence of an event, such as the event signaled at 640.

Method 600 may be used for a virtual corridor application, such as in front of a cashier or service counter. For example, method 600 may be used to detect the length of a queue of people waiting in line. The height of the virtual beam can be set to determine how tall people need to be for detection. For example, the height can be set to detect people over 4 feet tall to ignore children waiting with their parents, as well as to ignore shopping carts. The threshold number of people can be set based on a store policy for a desirable number of people standing in line. When the desirable number is exceeded, an alert can be generated and additional service personnel can be requested to open another checkout counter.

The virtual corridor application may be modified to account for a store policy of a desirable waiting time in line. For example, a line may be short and slow, such as when a cashier is delayed with a problem customer. The threshold for the number of people in line may be reduced based on the length of time elapsed after the last person left through the exit side of the virtual beam. Thus, the threshold number of people may drop as the speed of the line slows. In an alternative embodiment, a timer is started when a person enters the virtual beam through the entrance side and the timer is stopped when the person leaves the virtual beam through the exit side. If the person has not left the detection zone after a predefined time, an alert can then be generated.

FIG. 7 is a pictorial diagrammatic view of one embodiment of a multi-dimensional virtual beam 700 associated with an object of interest 710, such as an automobile. In one embodiment, virtual beam 700 is associated with the position of object of interest 710 so that virtual beam 700 moves with object of interest 710. Thus, virtual beam 700 can be set up to define an area around object of interest 710. Virtual beam 700 of annular shape includes an inner side 720 and an outer side 730. Outer side 730 is farther from object of interest 710 than is inner side 720. Objects can be detected leaving object of interest 710 when inner side 720 is the entrance side of virtual beam 700 and outer side 730 is the exit side of virtual beam 700. Alternatively, objects can be detected approaching or entering object of interest 710 when outer side 730 is the entrance side of virtual beam 700 and inner side 720 is the exit side of virtual beam 700. False alarm immunity of virtual beam 700 may be increased when a distance 740 between inner side 720 and outer side 730 is increased. Sensitivity of virtual beam 700 may be increased when a distance 740 between inner side 720 and outer side 730 is decreased.

Although virtual beam 700 is illustrated as an annulus, other shapes are possible. For example, each of the sides may be in the shape of a dome, sphere, box, pyramid, hexagon, or any other shape that completely or partly surrounds object of interest 710. The shape and center of inner side 720 may be different from the shape and center of outer side 720. However, in a preferred embodiment, inner side 720 is contained within the perimeter of outer side 730.

Moreover, although a three-dimensional virtual beam is illustrated in FIG. 7, a two-dimensional virtual beam may also be associated with an object of interest. For example, the sides may be in the shapes of concentric circles. However, the entrance side and the exit side need not be concentric. The sides may be any other two-dimensional shape that completely or partly surrounds object of interest. In a preferred embodiment, the inner side is contained within the perimeter of the outer side.

FIG. 8 is a flowchart of a method 800 of monitoring whether a first object of interest is passing through a detection zone that is within a field of view of a video camera and is associated with a second object of interest, according to one embodiment. Method B00 may be implemented, for example, by video surveillance system 100. Method B00 begins at 510 by receiving video data.

At B20, video analytics 132 are used to track the first object of interest in the video data. The first object of interest may be tracked as described at 520, for example.

At B30, a second object of interest represented by the video data and different from the first object of interest is tracked. The second object of interest may be tracked with video analytics 132, such as in 520 or B20, or may be tracked in other ways. For example, the second object of interest may be tracked using radio frequency identification (RFID) or other radio triangulation methods, GPS, or any other method of determining a position of the second object of interest. When the detection zone is associated with the position of the second object of interest, the detection zone will move along with or follow the second object of interest as it moves.

At B40, a multi-dimensional virtual beam, such as virtual beam 700, is used to detect whether the first object of interest is continually present in the detection zone as the first object of interest passes through the detection zone associated with the second object of interest. The multi-dimensional virtual beam includes an entrance side bounding the detection zone on one side and an exit side bounding the detection zone on a side opposite the entrance side. In one embodiment, the entrance side is farther from the second object of interest than is the exit side so that objects approaching the second object of interest can be detected. In an alternative embodiment, the entrance side is closer to the second object of interest than is exit side so that objects leaving the second object of interest can be detected.

At B50, an event is signaled when the first object of interest is continually present in the detection zone during a period beginning when the first object of interest enters into the detection zone through the entrance side and ending when the first object of interest leaves the detection zone through the exit side. Whether an object enters through an entrance side or leaves through an exit side may be determined according to the rules described at 550.

At 560, additional steps may be optionally performed based on the occurrence of an event, such as the event signaled at B50. Examples of the additional steps include alerting an attendant, recording a video clip, adjusting a recording quality level, sending an email, sounding an audible alarm, generating metadata, or logging a report.

Method 800 may be used in a variety of object localized applications. An object localized application includes a virtual beam that is associated with or localized around an object that may move. As an example, method 800 may be used for detecting when people leave their vehicles, or when someone walks up to a vehicle. A virtual beam associated with the vehicle can be defined to surround the vehicle, as illustrated in FIG. 7. By choosing whether the outer side or the inner side is the entrance side, the virtual beam can distinguish between people approaching a vehicle or leaving it. One potential advantage of using a virtual beam as an object localized beam, e.g., a virtual beam associated with an object, is that the virtual beam can follow the object around which the virtual beam is localized. For example, if the vehicle moves, the surrounding virtual beam moves with the vehicle. Or, if the virtual beam is localized around a person, and the person walks into a public park, the virtual beam can provide a detection zone around the person and triggers an alarm if that person is approached by another person.

As another example, method 800 may be used to create a protection zone around an airplane parked on an airport tarmac. The zone would be armed and active when the airplane is not in use. If the airplane is moved, the protection zone automatically moves with the airplane.

Method 800 may be used in a hospital setting. For example, a virtual beam can be localized around a piece of hospital equipment to detect and create a video record whenever someone touches the equipment. In one embodiment, if the equipment is moved, which is quite common in hospitals, then as soon as the equipment is stationary and in the view of a camera, such as camera 110, the virtual beam surrounding it can again become active. The localized beam can be configured to detect a person approaching or leaving the equipment. A detection event can cause a video clip to be recorded and stored in local storage 134 or mass storage 120. If the equipment is missing or damaged, then the video records associated with the equipment may be searched to find a cause of the missing or damaged equipment.

In a preferred embodiment, a hospital surveillance system may automatically create virtual beams around all portable equipment in the hospital. For example, the system can search for objects with the same appearance. This simplifies an effort to find equipment, by first identifying when it was last moved, and then looking for other moving objects of the same appearance, spotted by any of the cameras in the system and detected in the same time frame. To increase the speed of search, the system can create real-time metadata records of events, such as equipment being approached or moved, and the system can store the event metadata with other metadata about the equipment and the appearance of the people detected. The metadata may be used to target a search of video data, as compared to searching through all of the video data. In this manner, search time may be reduced when looking for missing hospital equipment.

A preferred video analytics system can set up a rule to automatically create virtual beams around objects of a certain type, such as vehicles, when they enter a parking lot. For example, the system can automatically trigger an event after a vehicle parks and a person leaves the vehicle. If that person then approaches another parked vehicle, the video analytics system can identify potentially suspicious activity. If the vehicle in which that person arrived is driven away, and that person thereafter approaches parked vehicles, a preferred system can treat this behavior as suspicious and alert guards.

A preferred video analytics system can use virtual beams as part of an overall behavior detection process. For example, a video analytics system can set up a rule to automatically create virtual beams around objects of a certain type, such as vehicles, when they enter a parking lot. The system can automatically set up a first virtual beam around an arriving car. An event can be triggered after the vehicle parks and someone leaves the car, crossing through the first virtual beam. If that same person, tracked by video analytics, then approaches another parked vehicle surrounded by a second virtual beam, the video analytics system can identify potentially suspicious activity. If the car in which that person arrived is driven away and that person thereafter approaches parked vehicles, the system can treat this behavior as suspicious and alert security guards. The video analytics can also detect a situation in which that person enters and starts a parked car that then begins to move from its parking space. In this manner, repeatable patterns of behavior practiced by criminals may be automatically detected by a video analytics system. By detecting suspicious activity in real time, security guards may be given valuable early warning to close automatic gate openings to prevent the thieves from leaving. Alternatively, the security guards can potentially operate a PTZ camera to 25 zoom in to identify license plates and get close-up pictures of those involved, and send this information to the police, for capture and arrest.

FIG. 9 is a flowchart of a method 900 of configuring a multi-dimensional virtual beam, according to one embodiment. Method 900 may be implemented, for example, by video surveillance system 100. Method 900 begins at 910 by defining a multi-dimensional virtual beam having an entrance side and an exit side bounding the detection zone on opposite sides. In one embodiment, a two-dimensional virtual beam overlaid on a visual image may be defined by pixel coordinates. A three-dimensional virtual beam representing a spatial location within a three-dimensional representation of the scene observed by camera 110 may be defined by coordinates corresponding to the scene representation. Alternatively, a two-dimensional virtual beam can be defined to represent area coordinates in a three-dimensional representation of the scene observed by camera 110.

The entrance and exit sides may be defined, for example, in an XML file or by a user dragging a cursor along the detection zone boundary over an image of the scene observed by camera 110. As described earlier with reference to FIG. 2, it may be desirable for the distance between the sides to be narrowed or widened depending on how far from or close to the detection zone is relative to camera 110. In a preferred embodiment, video analytics 132 may recommend narrower beams for areas farther from camera 110 and wider beams for areas closer to camera 110. In one embodiment, a virtual beam for a virtual corridor or virtual doorway may be defined in two dimensions, and a user may separately select a size of the object to be detected. Video analytics 132, for example, may automatically determine the average size of adults present in a region of the scene and automatically offer the user an option in a drop-down menu to choose between adults and children. Similarly, vehicles may be specified in meters or feet to detect only big-rig trucks while ignoring sedans, for example. After a detection zone boundary is defined, video analytics 132 may provide at its output a graphical representation of the boundary over the video image displayed by output device 150. When a ground plane is specified, video analytics 132 may shape automatically the angles of the detection area to match the angle of the ground plane.

At 920, the multi-dimensional virtual beam defined at 910 can be optionally associated with an object of interest, a characteristic of an object, or an object independent rule. For example, the virtual beam may be associated with a position of an object of interest. In other words, the virtual beam may be defined relative to the position of the object of interest so the virtual beam can move with the object. As another example, the virtual beam may be associated with a type of object so that only objects of a predefined type tracked within the boundary of the virtual beam will trigger a detection.

At 930, the type of object to be detected can be configured when setting up the detection rules, such as by choosing from a drop-down computer menu. For example, the virtual beam can be set to detect people, vehicles, boats, or more specific types of objects, such as school buses, fire trucks, and bicyclists. Examples of object independent rules include detecting objects at limited times of the day or during a reduced set of ambient lighting conditions. At 930, other rules can be added, such as the length of time allowed for objects to cross the virtual beam. An object's taking too much time (i.e., is moving too slow) or too little time (i.e., is moving too fast) to cross the virtual beam could be considered an event of interest.

At 940, a threshold number of objects of interest may optionally be defined and associated with the virtual beam, such as when method 600 is to be implemented. The threshold number can be preconfigured by a user and automatically adjusted if various criteria are met.

At 950, method 900 tests whether a threshold number of objects is defined for the virtual beam. If so, method 900 continues at 960, otherwise, method 900 continues at 970.

At 960, the video analytics system is armed to trigger an event when a number of objects of interest entering the detection zone through the entrance side of the virtual beam, remaining continually present in the detection zone, and leaving the detection zone through the exit side exceeds the threshold number defined at 940. In this manner, the video analytics system is armed to implement method 600.

At 970, the video analytics system is armed to trigger an event when the object of interest is continually present in the detection zone during a period beginning when the object of interest enters the detection zone through the entrance side of the virtual beam and ending when the object of interest leaves the detection zone through the exit side of the virtual beam. In this manner, the video analytics system may be armed to implement method 500 or method 900.

It will be obvious to those having skill in the art that many changes may be made to the details of the above-described embodiments without departing from the underlying principles of the invention. The scope of the present invention should, therefore, be determined only by the following claims.

What is claimed:

1. A system comprising:
    at least one video camera configured to monitor whether one or more people are passing through a detection zone within a field of view of a scene;
    memory;
    a processor; and
    a housing containing the at least one video camera, the memory and the processor, and
    the memory storing instructions that, when executed by the processor, cause the processor to:
        receive video data representing the field of view of the scene observed by the at least one video camera, the video data including a plurality of video frames captured by the at least one video camera during a time period;
        use video analytics to track the people represented in the video data;
        configure the detection zone, the detection zone including an entrance side and an exit side positioned opposite to each other and thereby defining opposite sides of the detection zone; and
        increment a count of the people upon occurrence of an event, the event being when a tracked person, among the people, is present in the detection zone in respect of at least most of the video frames during the time period, the time period beginning when the tracked person enters the detection zone on the entrance side and ending when the tracked person leaves the detection zone from the exit side; and
        use the count to monitor traffic flow patterns.

2. The system of claim 1 wherein the traffic flow patterns are traffic flow patterns in a store.

3. The system of claim 1 wherein at least one of the entrance side and the exit side comprises at least one of an arc, a circle, a dome, a sphere, a straight line, a pyramid, a box and a hexagon.

4. The system of claim 1 wherein, in configuring the detection zone, a distance between the entrance side and the exit side is determined.

5. The system of claim 4 wherein the distance between the entrance side and the exit side is lengthened to reduce a likelihood of occurrence of false alarms.

6. The system of claim 4 wherein the distance between the entrance side and the exit side is shortened to increase a sensitivity of detection.

7. A system comprising:
    at least one video camera configured to monitor whether one or more vehicles are passing through a detection zone within a field of view of a scene;
    memory;
    a processor; and
    a housing containing the at least one video camera, the memory and the processor, and
    the memory storing instructions that, when executed by the processor, cause the processor to:
        receive video data representing the field of view of the scene observed by the at least one video camera, the video data including a plurality of video frames captured by the at least one video camera during a time period;
        use video analytics to track the vehicles represented in the video data;
        configure the detection zone, the detection zone including an entrance side and an exit side positioned opposite to each other and thereby defining opposite sides of the detection zone; and
        increment a count of the vehicles upon occurrence of an event, the event being when a tracked vehicle, among the vehicles, is present in the detection zone in respect of at least most of the video frames during the time period, the time period beginning when the tracked vehicle enters the detection zone on the entrance side and ending when the tracked vehicle leaves the detection zone from the exit side; and
        use the count to monitor traffic flow patterns.

8. The system of claim 7 wherein at least one of the entrance side and the exit side comprises at least one of an arc, a circle, a dome, a sphere, a straight line, a pyramid, a box and a hexagon.

9. The system of claim 7 wherein, in configuring the detection zone, a distance between the entrance side and the exit side is determined.

10. The system of claim 9 wherein the distance between the entrance side and the exit side is lengthened to reduce a likelihood of occurrence of false alarms.

11. The system of claim 9 wherein the distance between the entrance side and the exit side is shortened to increase a sensitivity of detection.

12. A system comprising:
    at least one video camera configured to monitor whether one or more people are passing through a detection zone within a field of view of a scene; and
    a plurality of computer system modules including a video analytics module and a virtual beam module, at least one of the video analytics module and the virtual beam module being located remote from the at least one video camera; and the computer system modules configured to:
    receive video data representing the field of view of the scene observed by the at least one video camera, the video data including a plurality of video frames captured by the at least one video camera during a time period;
    use video analytics to track the people represented in the video data;
    configure the detection zone, the detection zone including an entrance side and an exit side positioned opposite to each other and thereby defining opposite sides of the detection zone; and
    increment a count of the people upon occurrence of an event, the event being when a tracked person, among the people, is present in the detection zone in respect of at least most of the video frames during the time period, the time period beginning when the tracked person enters the detection zone on the entrance side and ending when the tracked person leaves the detection zone from the exit side; and
    use the count to monitor traffic flow patterns.

13. The system of claim 12 wherein the traffic flow patterns are traffic flow patterns in a store.

14. The system of claim 12 wherein at least one of the entrance side and the exit side comprises at least one of an arc, a circle, a dome, a sphere, a straight line, a pyramid, a box and a hexagon.

15. The system of claim 12 wherein, in configuring the detection zone, a distance between the entrance side and the exit side is determined.

16. The system of claim 15 wherein the distance between the entrance side and the exit side is lengthened to reduce a likelihood of occurrence of false alarms.

17. The system of claim 15 wherein the distance between the entrance side and the exit side is shortened to increase a sensitivity of detection.

18. A system comprising:
at least one video camera configured to monitor whether one or more vehicles are passing through a detection zone within a field of view of a scene; and
a plurality of computer system modules including a video analytics module and a virtual beam module, at least one of the video analytics module and the virtual beam module being located remote from the at least one video camera; and
the computer system modules configured to:
    receive video data representing the field of view of the scene observed by the at least one video camera, the video data including a plurality of video frames captured by the at least one video camera during a time period;
    use video analytics to track the vehicles represented in the video data;
    configure the detection zone, the detection zone including an entrance side and an exit side positioned opposite to each other and thereby defining opposite sides of the detection zone; and
    increment a count of the vehicles upon occurrence of an event, the event being when a tracked vehicle, among the vehicles, is present in the detection zone in respect of at least most of the video frames during the time period, the time period beginning when the tracked vehicle enters the detection zone on the entrance side and ending when the tracked vehicle leaves the detection zone from the exit side; and
    use the count to monitor traffic flow patterns.

19. The system of claim 18 wherein at least one of the entrance side and the exit side comprises at least one of an arc, a circle, a dome, a sphere, a straight line, a pyramid, a box and a hexagon.

\* \* \* \* \*